United States Patent [19]
Harrison

[11] 4,031,528
[45] June 21, 1977

[54] TRANSMITTING OVER POWER LINES

[75] Inventor: David C. Harrison, Arlington, Mass.

[73] Assignee: General Public Utilities Corporation, New York, N.Y.

[22] Filed: July 26, 1976

[21] Appl. No.: 708,394

Related U.S. Application Data

[63] Continuation-in-part of Ser. No. 551,356, Feb. 20, 1975, abandoned.

[52] U.S. Cl. .............................. 340/310 R; 307/248
[51] Int. Cl.² ........................................ H04M 11/04
[58] Field of Search .................... 340/310 R, 310 A

[56] References Cited

UNITED STATES PATENTS

| | | | |
|---|---|---|---|
| 3,714,451 | 1/1973 | Whitney | 340/310 R |
| 3,786,473 | 1/1974 | Trombly | 340/310 R |

Primary Examiner—Thomas B. Habecker
Attorney, Agent, or Firm—Charles Hieken; Jerry Cohen

[57] ABSTRACT

A transponder transmitter for transmitting over power lines includes a rectifier circuit that rectifies the power at power line frequency to provide a unipolar potential having ripple at twice the power line frequency. A circuit receives a drive signal from a modulator for interrupting the unipolar potential at a rate corresponding to the carrier frequency of the modulating signal. Circuitry, including a triac couples the interrupted unipolar potential to the power lines.

7 Claims, 1 Drawing Figure

U.S. Patent
June 21, 1977
4,031,528
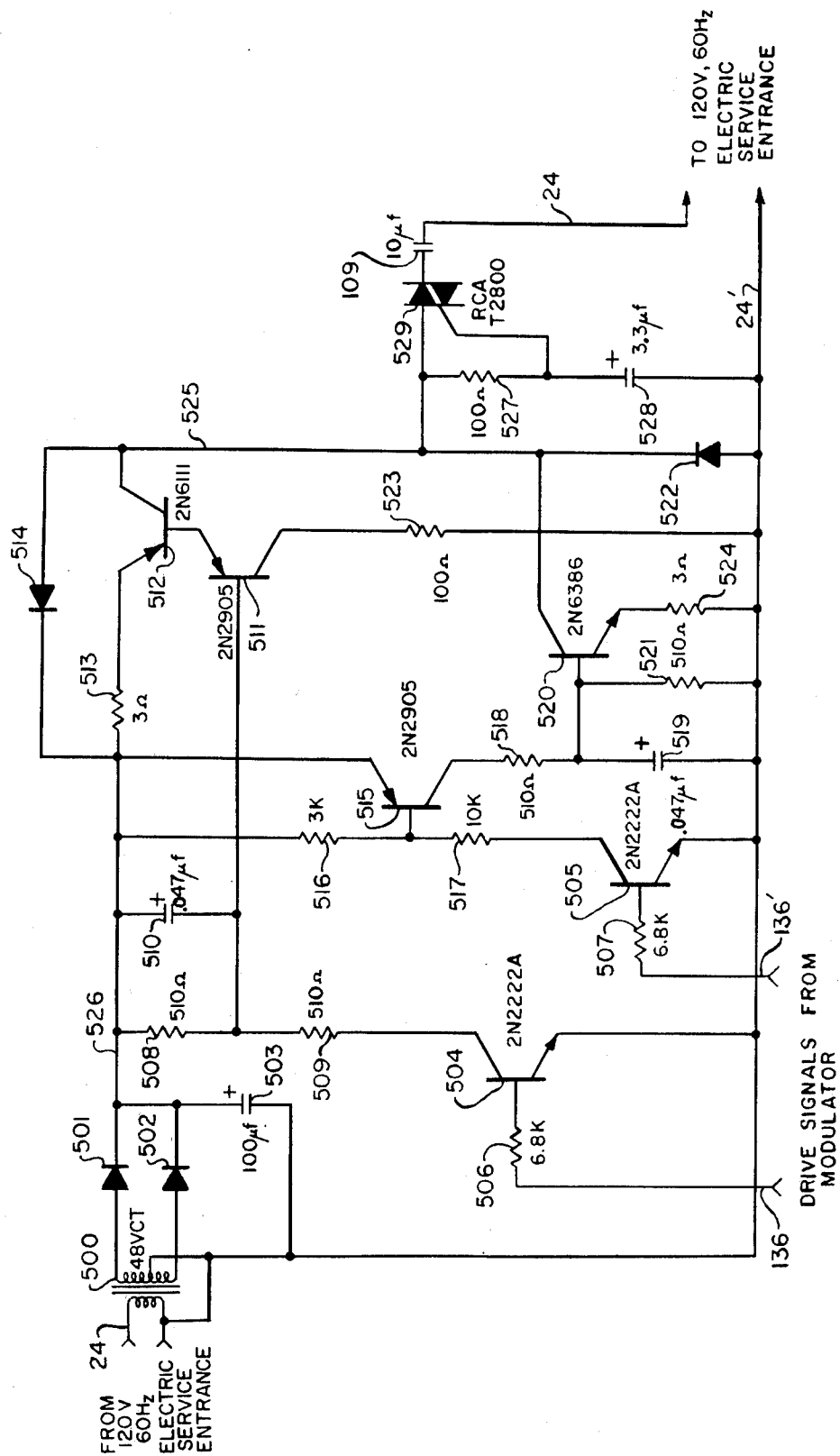

TRANSMITTING OVER POWER LINES

REFERENCE TO PRIOR COPENDING APPLICATIONS

This application is a continuation-in-part of copending application Ser. No. 551,356 filed Feb. 20, 1975 now abandoned, and discloses subject matter disclosed in application Ser. No. 535,352 filed Dec. 23, 1974, abandoned in favor of pending application Ser. No. 656,521 filed Feb. 9, 1976, owned by the assignee of this application.

BACKGROUND OF THE INVENTION

The present invention relates in general to transmitting and more particularly concerns novel apparatus and techniques for transmitting over power lines. The invention is especially useful for transmitting digital data over power lines. The invention is characterized by reliability, relatively good efficiency and is relatively inexpensive and easy to fabricate while being operative over a relatively broad range of frequencies.

It is an important object of the invention to provide a transmitter for transmitting over power lines.

It is another object of the invention to achieve one or more of the preceding objects with a transmitter that receives its energy potentials from a power line and uses ripple thus derived to help establish synchronism between the transmitted signal and the power line frequency.

It is another object of the invention to achieve one or more of the preceding objects with circuitry that is reliable and relatively efficient.

It is a further object of the invention to achieve one or more of the preceding objects with a transmitter that may operate over a wide range of frequencies without tuning.

SUMMARY OF THE INVENTION

According to the invention, there is a source of a unipolar potential derived from electrical power and having ripple at twice the power line frequency, means for interrupting the unipolar potential at a rate corresponding to a carrier frequency, and means for coupling the interrupted unipolar potential to the power lines to provide a carrier signal on the power lines. Preferably, the means for interrupting comprises transistor switching means coupled to the unipolar potential source and rendered alternatively conductive and non-conductive at a rate corresponding to the carrier frequency established by a modulating signal applied at a modulating input. The means for coupling the interrupted unipolar potential to the power lines typically comprises a triac.

Numerous other features, objects and advantages of the invention will become apparent from the following specification when read in connection with the accompanying drawing, the single figure of which is:

BRIEF DESCRIPTION OF THE DRAWING

A schematic circuit diagram of an exemplary embodiment of the invention.

DETAILED DESCRIPTION OF PREFERRED EMBODIMENTS

With reference now to the drawing, there is shown an exemplary embodiment of a transponder transmitter. Transformer 500 which is a Stancor P-8605, steps down the 120V, 60 Hz power line voltage from electric service entrance 24 and 24'. The reduced voltage is rectified by diodes 501 and 502, which are Motorola MR751, and filtered by capacitor 503. Transistors 504 and 505, which are 2N2222A, are normally turned off by the modulator signals on lines 136 and 136' from modulator 137 which provides a rectangular modulating signal at carrier frequency that is typically in the audio frequency range and an odd harmonic of half the line frequency, via resistors 506 and 507, respectively. When input terminals 136 and 136' receive a modulating signal, transistors 504 and 505 are switched 180 degrees out of phase. When transistor 504 is switched on, current flows through resistors 508 and 509, charging capacitor 510, thereby slowly switching on transistor 511, which is a 2N2905, whose collector current is limited by resistor 523, and transistor 512, which is a 2N6111 whose emitter current is limited by resistor 513. This raises the voltage on line 525 to that on line 526, thereby charging capacitor 528 through resistor 527. The voltage drop across resistor 527 causes triac 529 to conduct. When the modulating signal on line 136 switches off transistor 504, capacitor 510 discharges through resistor 508, slowly switching off transistors 511 and 512, while diode 514, which is a Motorola MR751, clips the spike created by the inductance of electric service entrance 24 and a distribution transformer. When transistor 505 is switched on by the modulating signal on line 136', transistor 515, which is a 2N2905, is switched on via resistors 516 and 517. Current then flows through resistor 518, charging capacitor 519, thereby slowly turning on transistor 520, which is a 2N6386, whose emiter current is limited by resistor 524. This lowers the voltage on line 525 to that on line 24', the service entrance neutral, thereby discharging capacitor 528 through resistor 527. The voltage drop across resistor 527 causes triac 529 to conduct. When the modulating signal on line 136' switches of transistor 505, capacitor 519 discharges through resistor 521, slowly switching off transistor 520, while diode 522, which is a Motorola MR751, clips the spike created by the inductance of electric service entrance 24 and the distribution transformer. The voltage transistions on line 525 are coupled to the electric service entrance, lines 24 and 24', by coupling capacitor 109.

The circuitry just described comprises a source of unipolar potential on line 526 derived from the electrical power and having ripple at twice the power line frequency. The transistor circuitry comprises means for interrupting the unipolar potential at a rate corresponding to the carrier frequency in response to the means for modulating applied to the bases of transistors 504 and 505 to interrupt the unipolar potential at a rate corresponding to the carrier frequency. The triac 529 comprises means for coupling the interrupted unipolar potential to the power lines to provide a carrier signal on the power lines.

The circuitry described above has the property of efficiently converting input a-c energy at power line frequency to output energy synchronized therewith applied to the lines of generally sinusoidal waveform at carrier frequency corresponding to the modulating signal of rectangular waveform at relatively low power levels applied to lines 136 and 136'.

There has been described novel apparatus and techniques for effectively communicating over power lines with numerous advantages and features described above. It is apparent that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited by the spirit and scope of the appended claims.

What is claimed is:

1. Apparatus for transmitting over power lines comprising, a source of a unipolar potential derived from electrical power on said power lines, a source of a modulating signal of carrier frequency for interrupting said unipolar potential at a rate corresponding to said carrier frequency, and means for coupling the interrupted unipolar potential to said power lines to provide a carrier signal of said carrier frequency on said power lines, said means for coupling comprising gated semiconductor switching means having gate electrode means and input and output electrode means in series with one of said power lines, gate resistive means connected between said input and gate electrode means, gate capacitive means connected between said gate electrode means and the other of said power lines, output transistor switching means connected to said input electrode means for selectively exchanging current with said gate capacitive means through said gate resistive means, input capacitive means coupled to said output transistor switching means for carrying a potential for slowly switching the latter amplifying means on, first and second input switching means responsive to said modulating signal coupled to said input capacitive means and rendered conductive during alternating contiguous time intervals at said carrier signal frequency for alternately charging and discharging said input capacitive means and thereby slowly switching on said switching off said transistor switching means whereby said gated semiconductor switching means delivers to said power line a slowly rising and falling current provided by said transistor switching means.

2. Apparatus for transmitting over power lines in accordance with claim 1 and further comprising a unilaterally conducting device connected across said output transistor switching means for clipping the spike created on said power lines in response to a sudden change in current when said gated semiconductor switching means changes conductive state.

3. Apparatus for communicating over power lines in accordance with claim 1 and further comprising, a second output transistor switching means, and a second input capacitive means connected to said input electrode means for selectively exchanging current with said gate capacitive means through said gate resistive means coupled to said second output transistor switching means for carrying a potential for slowly switching the latter switching means on.

4. Apparatus for communicating over power lines in accordance with claim 3 and further comprising first and second unilaterally conducting devices connected across respective ones of said first and second output transistor switching means for clipping spikes in response to sudden changes in current in response to said gated semiconductor switching means changing conducting state.

5. Apparatus for communicating over power lines in accordance with claim 1 wherein said modulating signal is of rectangular waveform.

6. Apparatus for communicating over power lines in accordance with claim 2 wherein said modulating signal is of rectangular waveform.

7. Apparatus for communicating over power lines in accordance with claim 4 wherein said modulating signal is of rectangular waveform.

* * * * *